(12) United States Patent
LeQuere (10) Patent No.: US 7,519,831 B2
(45) Date of Patent: Apr. 14, 2009

(54) HIGH SPEED CRYPTOGRAPHIC SYSTEM WITH MODULAR ARCHITECTURE

(75) Inventor: Patrick LeQuere, Villebon Suryvette (FR)

(73) Assignee: Bull S.A., Les Clayes Sous Bois (FR)

( * ) Notice: Subject to any disclaimer, the term of this patent is extended or adjusted under 35 U.S.C. 154(b) by 906 days.

(21) Appl. No.: 10/998,170

(22) Filed: Nov. 29, 2004

(65) Prior Publication Data

US 2005/0185790 A1 Aug. 25, 2005

(30) Foreign Application Priority Data

Nov. 28, 2003 (FR) .................................. 03 13965

(51) Int. Cl.
*G06F 11/30* (2006.01)
*H04L 9/32* (2006.01)
(52) U.S. Cl. ......................................... 713/189; 726/1
(58) Field of Classification Search ........................ None
See application file for complete search history.

(56) References Cited

U.S. PATENT DOCUMENTS 6,157,955 A * 12/2000 Narad et al. ................ 709/228
6,233,685 B1 * 5/2001 Smith et al. ................. 713/194
6,965,673 B1 * 11/2005 Boneh et al. .................. 380/28
2003/0131250 A1 7/2003 LeQuere
2004/0249764 A1 * 12/2004 Delitz et al. ................... 705/60
2005/0213597 A1 * 9/2005 McNulty ...................... 370/437

* cited by examiner

*Primary Examiner*—Kambiz Zand
*Assistant Examiner*—Monjour Rahim
(74) *Attorney, Agent, or Firm*—Miles & Stockbridge P.C.; Eric G. King (57) ABSTRACT

The present invention concerns a cryptographic system (1) with a modular architecture. Memory modules (3, 3', 3") make it possible to store information concerning authentication keys, data and commands, including a secure memory module (3') for containing the keys with integrity checking and an emergency erase function. Various types of algorithm modules (5, 5', 5") perform cryptographic functions of the cryptographic system by executing the commands stored in at least one memory module (3, 3', 3"). External interface modules (4, 4', 4") are utilized that make it possible to produce the link between the cryptographic system (1) and external devices, through a standard or proprietary input/output bus. A control unit (6) is responsible for the supervision of the various algorithm modules and the management of the keys, and a central interconnect module (2) assures handling of secure exchanges between blocks.

20 Claims, 7 Drawing Sheets

HIGH SPEED CRYPTOGRAPHIC SYSTEM WITH MODULAR ARCHITECTURE

RELATED APPLICATION

This application is related to U.S. application Ser. No. 10/329,672, filed Dec. 27, 2002, and entitled "A Module for Secure Management of Digital Data by Encryption/Decryption and /or Signature/Verification of Signature Which can be Used for Dedicated Servers". The subject matter of said application Ser. No. 10/329,672 is hereby incorporated by reference in its entirety.

FIELD OF THE INVENTION

The present invention concerns a cryptographic system with a modular architecture that allows the hardware implementation of security protocols at very high speed and with a high level of security. The field of application of the invention concerns high-speed encryption security products using technologies such as FPGA or ASIC.

BACKGROUND OF THE INVENTION

Processes for protecting data through encryption/decryption have, at the present time, become crucial, due to the growing increase in data exchanges of all types, and to the increasingly widespread use of high-power computing means, which can give less scrupulous individuals unauthorized access to data passing through a network. In order to deal with the acuteness of the aforementioned problems, the technical solutions developed to date have proposed cryptographic products produced in the form of integrated circuits, for example of the ASIC or FPGA type. Each circuit of this type is produced for purposes of a clearly defined application, for example the processing of a given protocol, and does not make it possible to implement several types of protocols. In any case, at the moment these components cannot be implemented in a cryptographic system with a modular architecture. In fact, one of the drawbacks of these components is that information on the detailed architecture is not available, making it impossible to implement the architecture in different types of technology. The algorithms of these components are not available and do not allow said components to be used in applications for protecting critical national and European infrastructures. Moreover, these ASIC or FPGA-type components do not have a reprogrammable part that makes it possible to adjust the encryption protocol implemented in said component based on the type of communication used. Furthermore, the security level of these components is often insufficient, or even nonexistent, said components having no separation of unencrypted and encrypted data flows. These components are not capable of handling constraints such as having secure key memories, managing alarms, or performing continuous tests for proper operation. There are other components offering higher levels of security, such as Motorola's AIM components. However, they are simple cryptographic components of medium speed, less than 100 Mb/s, whose level of performance is not adjustable to the required speed (for example 1 Gb/s) and which do not handle protocol processing. A modular cryptographic system using these standard components would be an expensive and very bulky product, for which no customized development of a PFGA or ASIC solution would be possible. Lastly, these components cannot be adapted to different types of external interfaces (PCI, PCI Express, SPI, etc.) without reworking the overall architecture.

SUMMARY OF THE INVENTION

The object of the present invention is to overcome certain drawbacks of the prior art by offering a cryptographic system that makes it possible to group together, in the same modular architecture, all of the encryption and protocol functions used by each type of application in at least one specific component.

This object is achieved by a cryptographic system with a modular architecture, characterized in that it comprises:
- memory modules that make it possible to store information concerning authentication keys, data and commands, including a secure memory module for containing the keys with integrity checking and an emergency erase function,
- various types of algorithm modules that perform cryptographic functions of the cryptographic system by executing the commands stored in at least one memory module,
- external interface modules that make it possible to produce the link between the cryptographic system and external devices, through standard or proprietary input/output buses,
- an administration module responsible for the supervision of the various algorithm modules and for the management of the keys, making it possible to monitor the modules of the system, to send test commands to the sequencer module and to receive status words indicating that a fault has occurred in the cryptographic system
- a central interconnect module capable of handling secure exchanges between blocks, making it possible to interconnect the algorithm modules, the memory modules, the external interface modules, and a control unit.

According to another characteristic, the control unit comprises
- a sequencer module that performs functions for distributing and sequencing commands by storing said commands in at least one memory module, triggering the execution of the algorithm modules and the external interface modules via a command block, and receiving a status word indicating the end of execution of said algorithm modules and external interface modules,
- an administration module or central unit responsible for the supervision of the various algorithm modules and for the management of the keys, making it possible to monitor the modules of the system, to send test commands to the sequencer module and to receive status words indicating that a fault has occurred in the cryptographic system
- a monitoring and alarm module linked to the administration module, which makes it possible to handle abnormal operations originating from other modules of the cryptographic system and to activate the essential security functions.

According to another characteristic, a protocol module may or may not be integrated into the cryptographic system, said protocol module being linked to the central interconnect module or to at least one external interface module, said protocol module making it possible to implement a security protocol by sending cryptographic macro commands to the sequencer module.

According to another characteristic, the main master modules of the cryptographic system are the protocol module, the administration module and certain external interface modules, the main slave modules are the memory modules, and the main master-slave modules are the sequencer module and certain external interface modules.

According to another characteristic, each algorithm module includes a submodule that executes commands for encryption or decryption or authentication code generation or authentication code verification, and an input/output submodule comprising at least a first interface, a second interface and a third interface, the first interface being linked to the internal bus of the central interconnect module for the transmission of data, keys and commands coming from the memory modules, the second interface being linked via direct memory access to the sequencer module in order to receive a signal for triggering the execution of a cryptographic command and to send a status word indicating the end of execution of the cryptographic command, the third interface being linked to the administration module in order to send a status word indicating that an abnormal operation has occurred during the execution of a cryptographic command.

According to another characteristic, the input/output submodule of an algorithm module includes an address register, a FIFO memory for sending data, a FIFO memory for receiving data, and a means for managing several command queues in memory, allowing a finer control of the parallelism in the execution of the algorithm modules, said modules having different transmission speeds.

According to another characteristic, the cryptographic system includes at least the following memory modules:

- an unencrypted data memory module containing data prior to encryption,
- an encrypted data memory module containing data after encryption,
- an encryption command memory module containing the commands corresponding to the algorithm modules for encryption and authentication code generation,
- a decryption command memory module containing the commands corresponding to the algorithm modules for decryption and authentication code verification,
- a secure key memory module containing the keys used by the algorithm modules for encryption and authentication code generation, According to another characteristic, each memory module includes a submodule for storing information and an input/output submodule, said input/output submodule being connected to the internal bus of the central interconnect module by a slave-type interface that allows simple or packet reading and writing in the memory module.

According to another characteristic, the input/output submodule of a memory module has a single-port interface.

According to another characteristic, the input/output submodule of a memory module has a double-port interface allowing two attachments to the internal bus of the central interconnect module: a first attachment dedicated to the transmission of unencrypted data and a second attachment dedicated to the transmission of encrypted data.

According to another characteristic, the input/output submodule of a secure memory module comprises two logical blocks: a first integrity checking block that checks, with each access to the memory, an integrity value associated with a key; in case of an integrity error, said block sends the monitoring and alarm module a status word pinpointing the error; and a second reset block that performs a complete erasure of the memory by rewriting all the addresses by means of a counter, the erasure being ordered by the monitoring and alarm module upon reception of a status word indicating an integrity error.

According to another characteristic, an external interface module includes a submodule that implements an exchange protocol, and an input/output submodule that can operate either in master mode, in slave mode, or in master-slave mode, in accordance with the mode of the exchange protocol, thus allowing the cryptographic system to be able to adapt to any type of security protocol.

According to another characteristic, the sequencer module comprises a command distribution means, said means making it possible to break down into micro commands each cryptographic macro command coming from the protocol module, each of the micro commands comprising a simple cryptographic algorithm, and to post the micro commands in a memory module for commands to be sent to other modules; said sequencer module comprises a first master-type interface linked to the central interconnect module, for sending an end-of-execution status word to the protocol module or the administration module, a second slave-type interface linked to the central interconnect module for receiving macro commands sent by the protocol module or test commands sent by the administration module, and for receiving status words indicating the end of execution of commands sent by the algorithm modules and the external interface modules, and a third interface in direct memory access mode, linked to the algorithm modules and to the external interface modules, for triggering the execution of said modules by sending them a command block; and the sequencer module includes a means for sequencing the commands, making it possible to activate the algorithm modules and the external interface modules in a defined order.

According to another characteristic, the administration module includes an administrative processor, peripheral circuits, an internal memory containing the program executed by the administrative processor, a test memory that makes it possible to execute test commands on the algorithm modules or the external interface module, a master interface linked to the central interconnect module that makes it possible to send test commands to the sequencer module and to receive status words indicating faulty modules, a slave interface that makes it possible to receive status words sent by the sequencer module in order to indicate the end of a test command executed by an algorithm module or an external interface module, and an external link dedicated to the passage of sensitive data coming from devices outside the cryptographic system.

According to another characteristic, the administration module initializes a secure key memory module of the cryptographic system at the startup of said cryptographic system, reads encrypted keys in a memory of an external device or through a dedicated external link, then decrypts said encrypted keys and writes them into the secure key memory module of the cryptographic system.

According to another characteristic, the central interconnect module includes a series of data and address multiplexers that allow the modules of the cryptographic system to access other modules of said system, arbitration submodules that prevent simultaneous access conflicts between modules, and security mechanisms that guarantee access rights between modules, the accesses to said central interconnect module taking place concurrently for all of the modules of the cryptographic system.

According to another characteristic, the central interconnect module guarantees read access by the algorithm modules for encryption and authentication code generation to a secure key memory module, by verifying a check word representing the use of each key, and as soon as an error is detected, the central interconnect module sends an error word to the monitoring and alarm module.

According to another characteristic, a command block sent by the sequencer module to an algorithm module comprises the following fields:

a first macro command field containing at least two pieces of information, the first piece of information indicating the use of a key and the length of the key, and a second piece of information indicating the management of an optional context.

a second field indicating a number representing the macro command processed, a third field indicating a first address pointing to a buffer memory area containing the data required to execute the macro command, a fourth field indicating a second address pointing to a buffer memory area made available for containing a result of the execution of the macro command, a fifth field indicating the length of the data located in the buffer memory to be encrypted, a sixth field containing the address of the key required to process the macro command.

According to another characteristic, a command block sent by the sequencer module to an external interface module comprises the following fields:

a first command field containing the number of the associated macro command, a second field indicating the length of the data to be transferred to or from the outside, a third field indicating a first address pointing to a buffer memory area containing the data to be transferred, a fourth field indicating a second address pointing to a buffer memory area made available for receiving data coming from devices outside the cryptographic system.

According to another characteristic, the status word includes at least a first field and a second field, the first field indicating the number of the executed or faulty macro command, and the second field indicating an error code representing a type of fault occurring during the execution of the macro command.

BRIEF DESCRIPTION OF THE DRAWINGS

Other characteristics and advantages of the present invention will emerge more clearly through the reading of the description below, given in reference to the attached drawings, in which.

The object of this patent application is to propose an architecture for a cryptographic system disposed on an integrated chip that allows the hardware implementation of security protocols at very high speed and with a high level of security in FPGA or ASIC, while avoiding the aforementioned drawbacks.

DESCRIPTION OF THE PREFERRED EMBODIMENT(S)

For a better understanding of the cryptographic system, the operation of a known communication security protocol, IPSEC (Internet Protocol Security), is described below. This protocol makes it possible to encapsulate (or contain) source IP frames in new IP frames created under the same protocol, said new frames having as their source and destination addresses those of the encryption hardware. The content of each frame is, moreover, encrypted using a known symmetric algorithm, all of the encryption keys being secret, of the 3DES or AES type. The header of the frame and its encrypted content are authenticated by means of a message authentication code (MAC) added to the end of the new frame. The choice of the encryption algorithms and authentication keys and the management of the encapsulation are the main functions fulfilled by a protocol processing module, called a protocol module. This module generates macro commands to be sent to the cryptographic part of a system, making it possible to simultaneously perform the respective operations for generating an initialization vector for a frame, for encrypting or decrypting the frame, and for generating and/or verifying the message authentication code. The macro commands coming from the IPSEC processing module are generally broken down, by a hardwired sequencer, into as many cryptographic micro commands as necessary. The complete implementation of the IPSEC protocol is therefore accomplished by means of a protocol processing module inside or outside the cryptographic system associated with a hardwired cryptographic command sequencer, in this case the protocol module (10) of FIG. 1.

The high-speed cryptographic system with a modular architecture that is the subject of the present invention will now be described in greater detail in connection with FIG. 1 and the subsequent figures.

Figure 1:
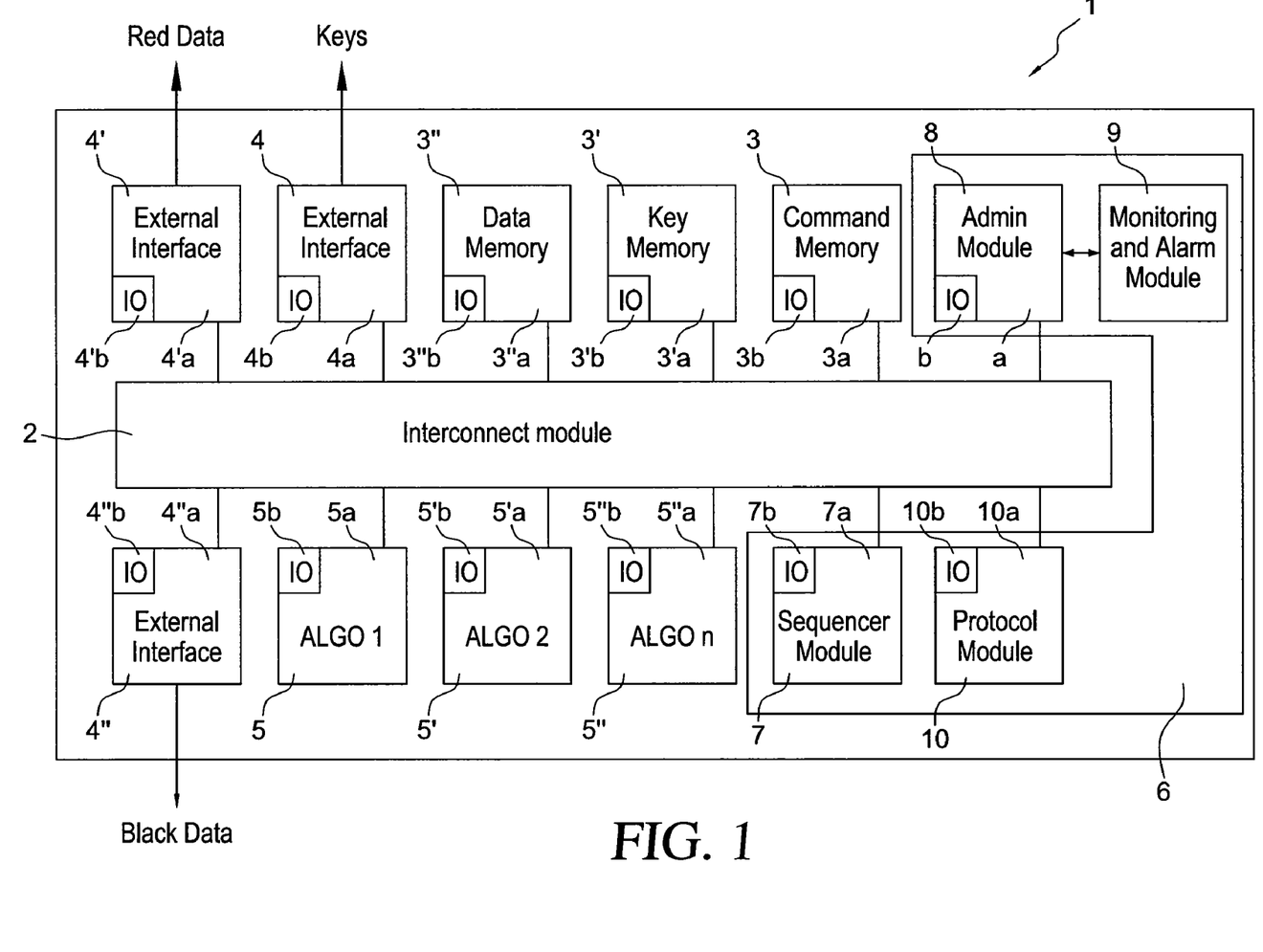
FIG. 1 shows a diagram representing the architecture of the cryptographic system according to an embodiment of the present invention.

FIG. 1 represents an overall view of the architecture of the cryptographic system (1) of the present invention. This system (1) is constituted by several modules, each having its own function. These modules are presented in the description that follows. The majority of the modules are constituted by two submodules, a submodule called a "heart" (a) that makes it possible to perform the specific function of the module, for example the memory function, the protocol function, etc., and an input/output submodule called I/O (b) that allows an exchange of data and commands with the other modules via a central interconnect module (2) called a crossbar. The central interconnect module (2) makes it possible to handle secure exchanges between blocks, such as the right to access memories, the partitioning of paths, etc. The modules provided in the architecture of the system are of different types, based on the needs of the cryptographic system. In the embodiment of the present invention represented in FIG. 1, the system (1) comprises a central interconnect module (2), memory modules (3, 3', 3"), external interface modules (4, 4', 4"), algorithm modules (5, 5', 5") and a control unit (6) comprising a sequencer module (7), an administration module (8), an alarm module (9) and a protocol module (10). This last module, however, may not be integrated into the system (1) and may be replaced by an external protocol processing module connected to one of the external interfaces (4, 4', 4") of the cryptographic system (1). The memory modules (3, 3', 3") each implement a particular memory, for example for data (3"), decryption keys (3') or commands (3). The protocol module (10), which can be disposed outside as well as inside the system of the present invention, implements a known security protocol such as IPSEC or SSL or the like, and generates cryptographic macro commands to a sequencer module (7). When the protocol module (10) is not implemented inside the system but outside it, the commands addressed to the sequencer module (7) are sent via an external interface module (4) to the sequencer module (7). The sequencer module (7) breaks the macro commands down into micro commands, and handles the separation and distribution of the various cryptographic commands to corresponding algorithm modules (5, 5', 5"). The sequencer module (7) receives as input cryptographic commands coming from the administration module (8), from the protocol module (10), or from an external command interface module (4) if there is no protocol module (10). The algorithm modules (5, 5', 5") process the micro commands and send a status signal informing the sequencer module (7) of the end of the operation. The administration module (8) is responsible for supervising the various algorithm modules (5, 5', 5") and for managing the authentication keys. Said module implements initialization and test functions by sending micro commands to the sequencer module (7) and also manages external interfaces (4, 4', 4") dedicated to the loading of the keys and to the cryptographic initialization functions such as configuration. The monitoring and alarm module (9) handles all the errors originating from the algorithm modules (5, 5', 5"), from the memory modules (3, 3', 3") and from the outside. It generates both alarm signals and signals that disable the sequencer module (7) and the input/outputs of the system of the present invention. These various modules, presented above, are describe in greater detail later in the description.

Figure 2A:
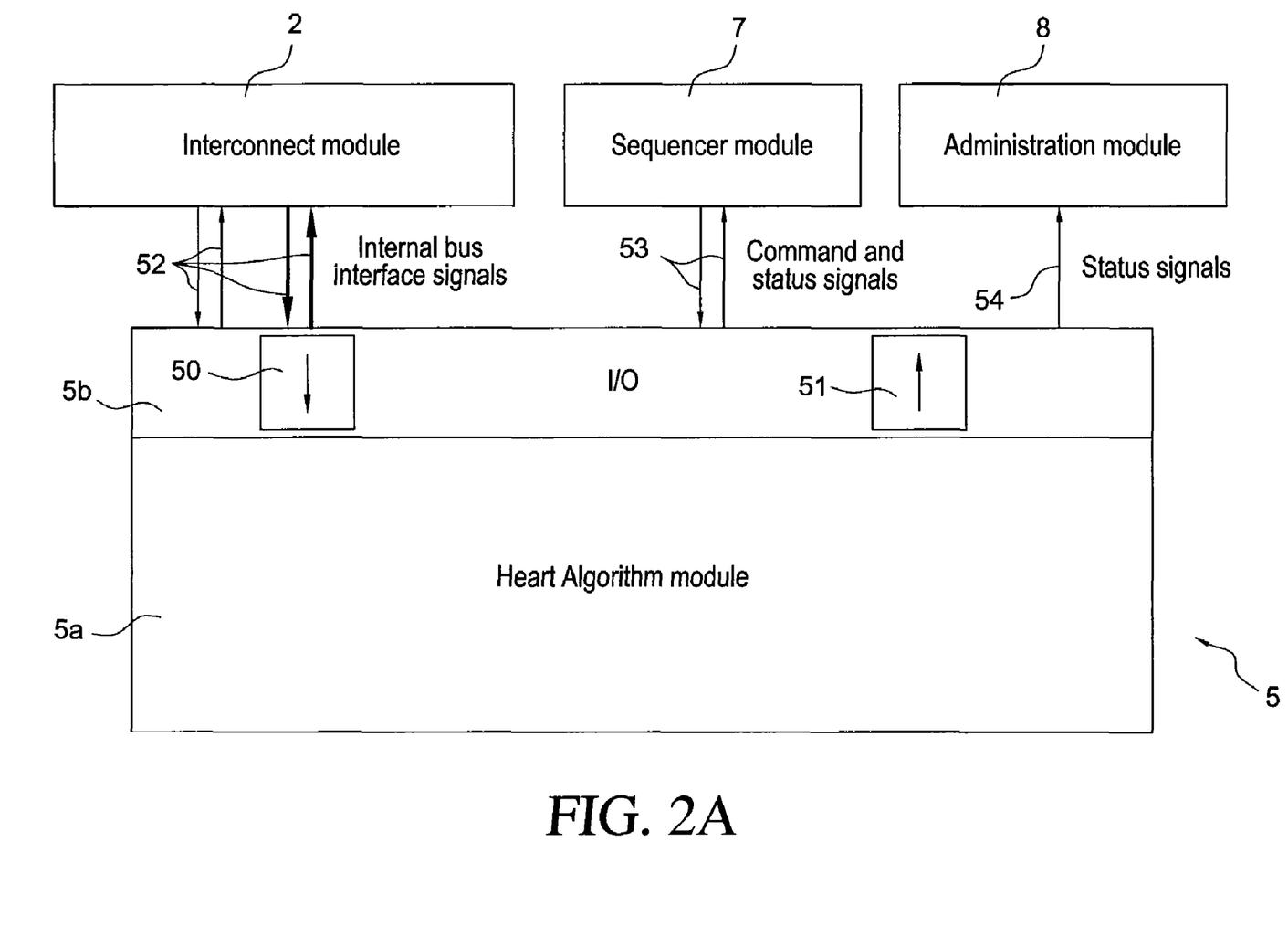
FIG. 2A shows the functional diagram of an algorithm module used in the cryptographic system according to the present invention.

FIG. 2A represents the diagram of an algorithm module (5) as described in French patent application No. 2,834,361 entitled "Architecture for a Symmetric Encryption Component," corresponding to the aforementioned U.S. application Ser. No. 10/329,672, while adding to it specific supplementary characteristics of the system of the present application; the algorithm module or modules (5, 5', 5") can be different types such as symmetric algorithm modules, for example 3DES, AES, RC4, hash algorithm modules, for example SHA, MD5, MAC-AES, and asymmetric algorithm modules, for example RSA and ECC. Like a great majority of the modules implemented in the system, each algorithm module (5) is constituted by a submodule called a "heart" (5a), which corresponds to the specific function of the algorithm, and an input/output submodule (5b), called "I/O," which makes it possible to receive and transmit information to other modules of the system. The heart submodule (5a) allows the implementation of an encryption or decryption or authentication algorithm. The I/O submodule (b) includes an address register initialized with the address of the first command to be executed. The I/O submodule (b) also includes a FIFO memory (50) for sending data, which allows data to be written into the heart submodule, and a FIFO memory (51) for receiving data, which allows data to be read in the heart submodule (5a). The attachment of the algorithm module (5, 5', 5") to the various modules of the system of the present invention is accomplished through three interfaces (52, 53, 54), represented below. A first interface (52) linked to the central interconnect module (2) is used for movements of data, commands and keys. The interface signals from the internal bus of the interconnect module allow the algorithm module (5a) to read and write into the internal or external memory of the cryptographic system using a master bus protocol explained in the description of the interconnect module (2). A second interface (53) linked to the sequencer module (7) is used for the startup and the initialization of the commands executed by the algorithm module (5). The interface signals going to and coming from the sequencer module (7) are used by the sequencer module (7) for its command distribution function. A third interface (54) linked to the administration module (8) is used for error processing. The interface signals to the administration module (8) are used to report errors and to activate the security management of the system of the present invention, described later in the description. The administration module (8) then invokes the monitoring and alarm module (9) in order to manage the abnormal operations detected. Each algorithm module (5) works under the control of the sequencer module (7) in direct memory access mode (dma). The sequencer module (7) first loads into the command memory module (3) of the cryptographic system (1) command blocks to be executed by the algorithm modules. Next, the sequencer module (7) proceeds to initialize an algorithm module (5) by communicating to the latter the address of the command memory area assigned to it. The sequencer module (7) sends an initialization signal comprising, for example, the memory address located in the command memory in which the command block intended for it is stored. This address is loaded into the address register of the algorithm module (5). Each command includes a specific check word of the algorithm implemented in the module, the input and output addresses of the data buffer memories and the size of these buffer memories, a pointer defining the address of the key stored in the key memory of the system, and possibly a pointer to an optional context memory area or to an initialization vector. These characteristics are presented later in the description. The sequencer module (7) activates a command signal addressed to the algorithm module (5) in question. The I/O submodule (b) of the algorithm module (5), using the internal bus interface of the interconnect module (2), will search the various memory modules (3, 3', 3") for the command, the data and the key used. At the end of the execution of the command, the I/O submodule (5b) of the algorithm module (5) informs the sequencer module (7) of the end of the operation by sending it a status word (56). This status word makes it possible, through its content, to inform the sequencer module (7) of the result of the execution of a specific function, for example the verification of the authentication code of the message (MAC), indicating to it whether the result is good or bad. Likewise, as soon as an abnormal operation is detected by the algorithm module (5) during the execution of a command, the I/O submodule (5b) sends the administration module (8) the status word (56), informing it, through a different content, of an error status.

One of the additional characteristics of an algorithm module (5) of the present invention consists in that the I/O part of the module includes a means for managing several command queues in memory if necessary, in order to allow a finer control of the parallelism of the various algorithm modules (5, 5', 5 ") when they have different speeds, for example, a 1-Gb/s encryption module associated with two MAC calculating modules with a speed of 500 Mb/s each. The encryption module can then, thanks to the two command queues, be seen as two virtual modules of 500 Mb/s each.

Figure 2B:
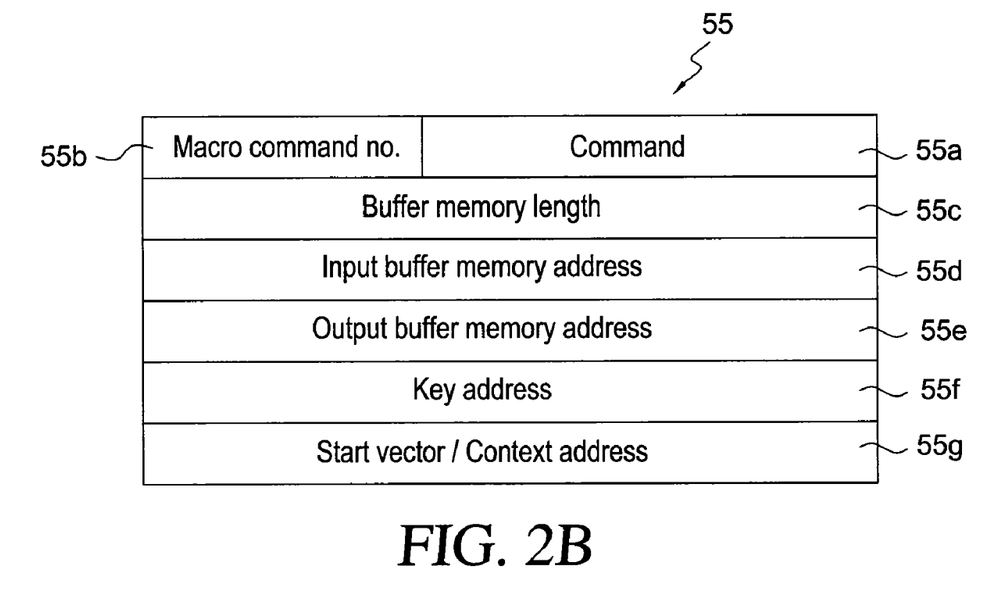
FIG. 2B shows a diagram representing the structure of a command block of an algorithm module, according to the embodiment of the present invention.

FIG. 2B represents the structure of a command block (55) loaded by the sequencer module (7) into the command memory module (3) of the system (1), the command block being intended for one of the algorithm modules (5, 5', 5''). A command block includes several distinct fields, each field comprising a 32-bit word. A first field (55a), the command field, is specific to the type of algorithm used to execute a specific macro command, for example the encryption/decryption algorithm or the algorithm for calculating a MAC. This field contains at least two pieces of information, a first piece of information on the use of a key and the length of this key, and a second piece of information concerning whether or not an optional context is managed. The context is constituted by all of the pertinent parameters of the algorithm, which must be saved between each command when these commands apply to buffer memories of concatenated data. This is the case, for example, when a data buffer memory is too large to be processed by a single command and must be split up into several buffer memories of smaller size. These buffer memories are called concatenated data buffers. The encryption executed by the algorithm module (5) must then resume at the precise point at which it stopped in the preceding buffer memory, even if in the meantime the algorithm module (5) has had to execute a command for another buffer memory. A second field (55b) of the command block corresponds to an associated macro command number. This number is copied into the status word (56) and sent back to the sequencer module (7) at the end of execution, allowing the latter to identify the macro command processed. A third field (55c) contains the size of the buffer memory to be encrypted. A fourth field (55d) corresponds to the address pointing to the data memory for writing the result of the macro command executed by the algorithm. A fifth field (55e) corresponds to the address pointing to the data memory area containing the data required to execute the macro command; said memory area is read by the algorithm module (5). A sixth field (55f) contains the address of the encryption or authentication key (MAC). The keys are stored in a secure key memory separate from the data. A secure memory is a memory whose wiring or control means makes it read- or write-inaccessible from the outside, except by an authority. Only the processing means of the integrated circuit can read the keys, but the latter cannot be used from outside the integrated circuit and can only be used internally for encryption or decryption.

Figure 2C:
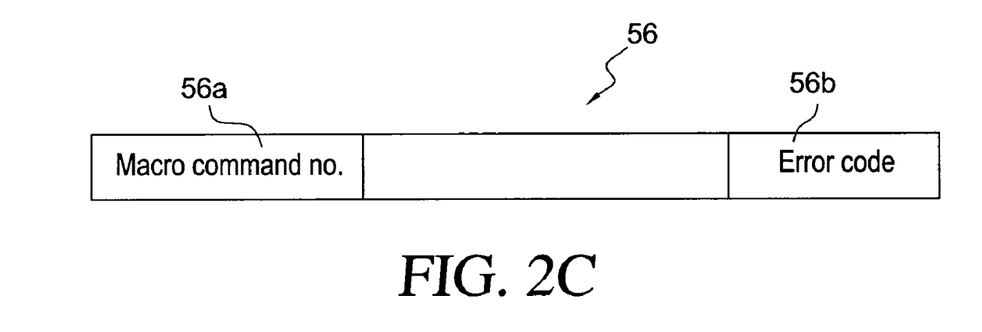
FIG. 2C shows the diagram representing a status word sent by an algorithm module or external interface module to a sequencer module.

FIG. 2C shows a diagram representing a status word sent by the algorithm module (5) back to the sequencer module (7) or the administration module (8) at the end of execution of a command. In one embodiment of the present invention, this status word can contain 32 bits. This status word (56) is sent to the sequencer module (7) when the result of the operation executed by the algorithm module (5) is good or bad, without there being in any error in the operation of the module in question. For example, upon verification of a MAC associated with a message, the good or bad result must be transmitted to the protocol level (IPSEC). The status word is sent to the administration module (8) when the algorithm module has detected an error during the execution of the operation. The latter posts a signal to the alarm module (9) and at the same time sends a status word (56) to the administrator (8) for traceability. The status word (56) includes a macro command number field (56a) that allows the sequencer module (7) to report the information to the protocol processing module (10). The status word (56) also includes an error code (56b) that depends on the type of module and the associated potential errors. The error could be, for example, an error in the command field, a length error, or an address error.

Figure 3A:
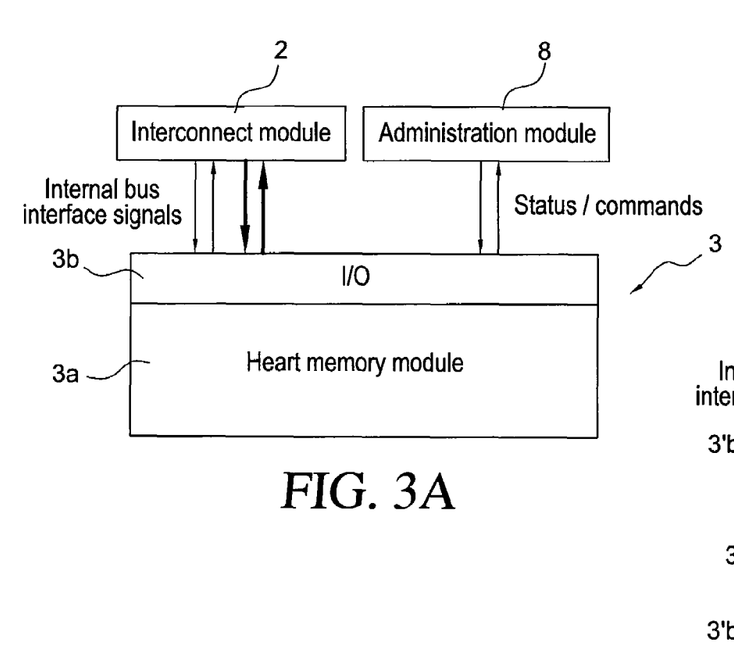
FIG. 3A shows a diagram representing a single-interface memory module of the cryptographic system according to an embodiment of the present invention.
Figure 3B:
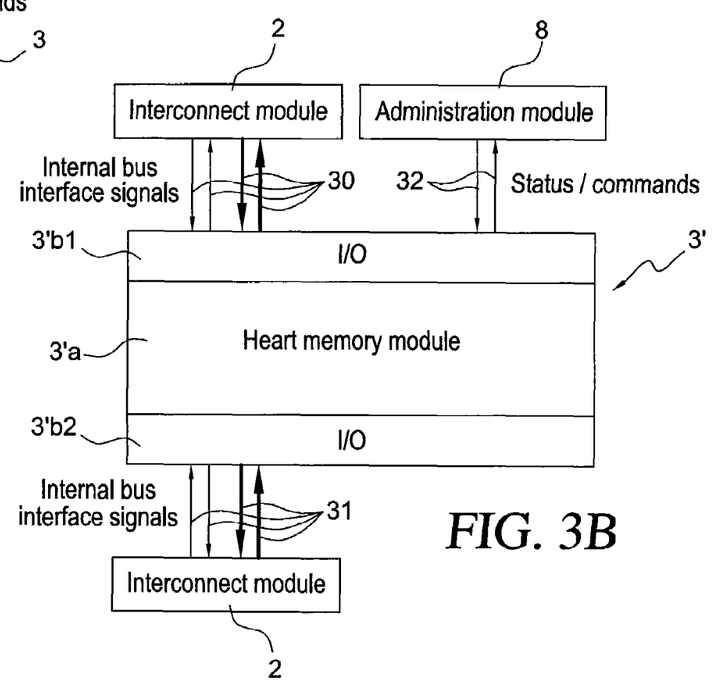
FIG. 3B shows a diagram representing a secure dual-interface memory module of the cryptographic system according to the present invention.

FIGS. 3A and 3B show diagrams representing the memory modules (3, 3', 3'') implemented in the cryptographic system (1) of the present invention. The memory modules (3, 3', 3'') comprise a heart submodule (3a, 3'a) that makes it possible to store the data, commands and keys of the system and an input/output or I/O interface module (3b, 3'b1 and 3'b2) that allows the memory module to interface with the interconnect module (2). The I/O submodule can include a single-port interface (3b) as shown in FIG. 3A or a dual port interface (3'b1 and 3'b2) as shown in FIG. 3B. The memory present in the system is separated into several modules based on the types of information stored, such as the commands, the data or the keys. The required security level is a partitioning between unencrypted data, called red data, and encrypted data, called black data. When the memory module (3') is a dual-interface module, as shown in FIG. 3B, it has two attachments to the internal bus of the interconnect module (2). The interface of the I/O submodule (3'b1 or 3'b2) of the memory module (3') that makes it possible to connect to the interconnect module (2) is a slave-type interface. Thus, the group of signals exchanged between the two modules makes it possible to perform a simple or packet read or write in the memory. In the case of a secure memory module (3'), it is necessary to add to the interface (3'b1 or 3'b2) of the I/O submodule signals for exchange with the administration module (8), thus making it possible to report any integrity error status during the reading of a key to the alarm module (9) and to generate, at the order of the alarm module, an erasure of the entire memory. The cryptographic system (1), according to one embodiment of the present invention, includes five types of memory modules (3, 3', 3''):

- a red data memory module is constituted by a dual-interface memory. This memory contains the unencrypted data prior to encryption.
- a black data memory module is constituted by a dual-interface memory. This memory contains the encrypted data after encryption.
- an encryption command memory module contains all of the commands corresponding to the algorithm modules (5, 5', 5'') for encryption and MAC generation.

Its typical size depends on the number of modules implemented and on the size of the command blocks.

- a decryption command memory module contains all of the commands corresponding to the algorithm modules (5, 5', 5'') for decryption and MAC verification. Its typical size depends on the number of modules implemented and on the size of the command blocks.
- a dual-interface key memory module (3') contains all of the keys used by the algorithm modules (5, 5', 5'') for encryption and authentication. This last memory module is secure and therefore also includes two supplementary logical blocks. A first block, called an integrity checking block, checks, with each access to this memory, an integrity value associated with the key. In case of error, a status is generated and sent to the alarm module (9). A second, reset block performs a complete erasure of the memory by rewriting all of the addresses by means of a counter. This function is activated upon reception of a command from the alarm module (9). The typical size of such a module is a function of the number of keys implemented and of the size of each key.

Each of the above memories is preferably a dual-interface memory (3'), and therefore makes it possible to have two attachments to the internal bus of the interconnect module (2). Because of this, the bandwidth available for data transfers is much greater.

Figure 4A:
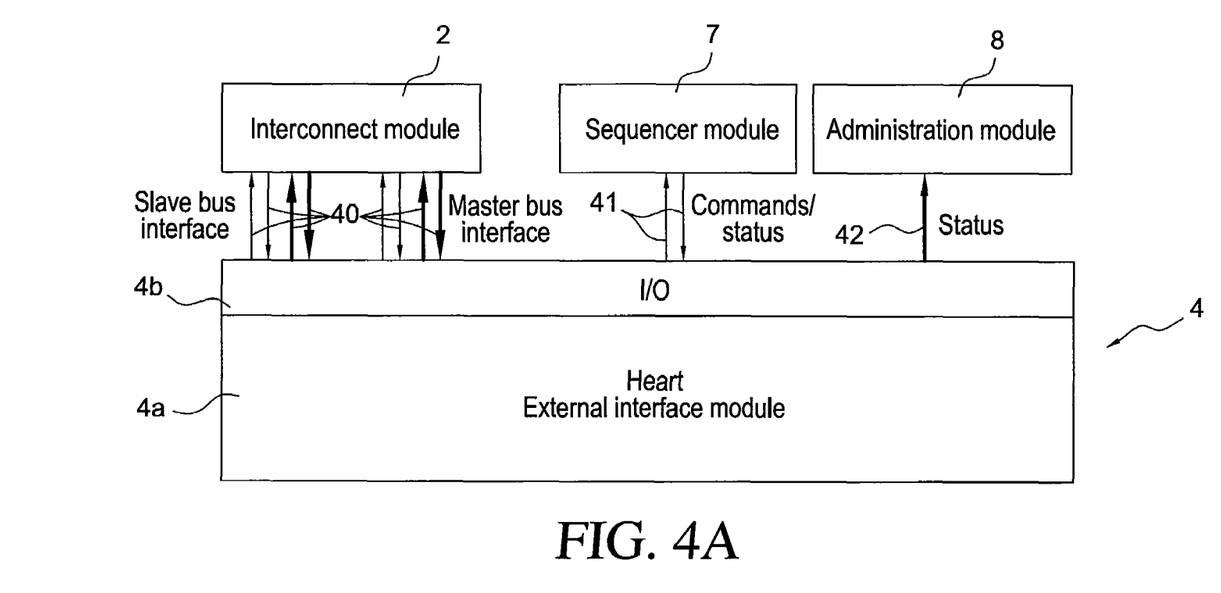
FIG. 4A shows a diagram representing a master-slave external interface module of the cryptographic system according to an embodiment of the present invention.

Referring to FIG. 1, the cryptographic system according to one embodiment of the present invention includes various external interface modules (4). These modules are responsible for interfacing the modular cryptographic system (1) according to the present invention with the outside world. The outside world can include, for example, a processor for handling network interfaces, data memories of the DRAM type, and specialized memories of the fast CAMs or fast SRAM types. If the protocol module is not integrated into the cryptographic system, a component for processing protocols such as the IPSEC protocol can also be interfaced with the system. The external interface modules (4, 4', 4") must therefore be able to adapt to the greatest possible number of exchange protocols. Certain exchange protocols that handle connection to a processor, such as the PCI, SPI-3, SPI-4, Hypertransport, RapidIP, and specific processor bus protocols, are slave external protocols. The exchange protocols that handle connection to memories of the DDR, QDR, CAMs and SRAM types are master external protocols. The protocols that handle connection to specific components such as FPGA or ASIC-type components are master-slave external protocols. Certain external interface modules (4, 4', 4") operate in master mode or slave mode, or both at the same time. When the transfers take place in master mode, the external interface module includes two direct access channels to the memory, each channel being dedicated to one transfer direction. Referring to FIG. 4a, the generic external interface module (4) comprises two submodules. An executor submodule (4a), called a "heart," is responsible for implementing the exchange protocol specific to the interface chosen, for example PCI. An input/output submodule I/O (4b) is responsible for interfacing the particular exchange protocol with the interconnect module (2) of the cryptographic system (1). The I/O submodule (4b) can include direct memory access channels, and in this case is interfaced with the sequencer module (2). The I/O submodule (4b) can also report error statuses to the alarm module (9) like any submodule of the algorithm module (5). The I/O submodule (4b) makes it possible to handle the various exchange modes based on the type of external protocol interfaced. For a slave external protocol, for example, an external processor writes or reads in the cryptographic system; the I/O submodule (4b) in this case is a simple master type, i.e., without direct access to the memory. In this case, the I/O submodule (4b) includes an address decoder that allows an external master, for example a processor or an ASIC, to access certain internal modules of the cryptographic system (1).

For a master external protocol, for example a memory interface, the I/O submodule (4b) is a master or slave type with direct memory access. In this case, the I/O submodule (4b) simply includes a FIFO memory for sending data to the outside and a FIFO memory for receiving data. These memories allow a module inside the system (1), for example the protocol module (10), to access an external memory by performing writes/reads via the internal bus of the interconnect module (2).

Figure 4B:
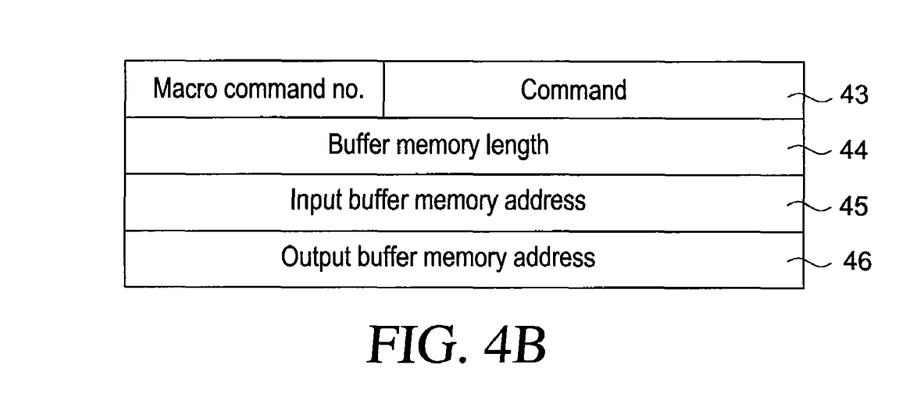
FIG. 4B shows a diagram representing the structure of a command block sent by a sequencer module to an external interface module of the cryptographic system according to an embodiment of the present invention.

For a master-slave external protocol, for example a PCI interface, the I/O submodule (4b) is a simple master-slave or master type with direct memory access. A master external interface module (4) with direct memory access allows the cryptographic system (1) to transfer the data to be processed directly among the external memories and the internal memories of the system (1). The master I/O submodule (4b) with direct memory access is identical to the I/O submodule (5b) of the algorithm modules (5, 5', 5"). The direct memory accesses are controlled by a sequencer module (7) by sending command blocks. FIG. 4B represents the diagram of a command block sent by the sequencer module (7) to an external interface module (4) in order to initiate a direct memory access operation on an external interface module (4). The sequencer module (7) posts to a memory in the command memory module (3) a command block of four 32-bit words. The first field (43), the command field, includes only the number of the macro command associated with the direct memory access operation. The second field (44), the buffer memory length field, indicates the number of 32-bit words to be transferred. The third field (45) indicates an address pointing to a buffer memory area comprising the data to be transferred. The fourth field (46) indicates an address pointing to an area of the buffer memory intended to receive the data coming from the outside. As a rule, there are two direct memory access channels, one per transfer direction.

In reference to FIG. 1, the interconnect module (2), called an interconnect crossbar, makes it possible to connect the various modules of the cryptographic system (1) to one another. This interconnect module (2) is constituted by a series of data and address multiplexers, allowing each master module to access the slave module of its choice. Unlike with a standard connection bus, accesses to the interconnect module (2) take place concurrently for all of the modules. The main master modules of the system are the algorithm modules (5, 5', 5"), the protocol module (10), the administration module (8), and certain external interface modules (4). The main slave modules are the internal memory modules (3, 3', 3"). The main master-slave modules are the sequencer module (7) and certain external interface modules (4).

The interconnect module (2) also includes various arbitration modules that make it possible to resolve the simultaneous access conflicts of several masters to the same slave. The arbitration is done based on a conventional rotating priority. The crossbar module includes as many local arbitrators as there are slave modules to which access is shared by several masters. The interconnect means (2) implements specific security mechanisms in order to guarantee that only the authorized algorithm modules (5, 5', 5") access the data they have to process. Certain security functions are incumbent on the interconnect module (2). The interconnect module (2) guarantees through hardwiring that only the authorized paths are installed. For example, if there should not be a path between the protocol module (10) and the key memory module (3) or between the administration module (8) and the data memory modules (3), these paths are not created. The interconnect module (2) guarantees that the algorithm modules (5, 5', 5") do not access the memory modules (3, 3', 3") in any mode other than the one authorized. For example, if an encryption module should only have read-access to the red data memory, any attempt to write into this memory from this module will activate the error signal of the interconnect module. It is thus possible to implement access rights of certain master modules to only the authorized slave modules. The interconnect module guarantees the access of the encryption and authentication modules to the dedicated keys located in secure memory. Each key has a check word that defines its type, such as encryption key, decryption key, authentication generating key and authentication verifying key. This word is then verified by the interconnect module when this memory is read-accessed. If an encrypting algorithm module (5) tries to access a decryption or authentication key, the interconnect module (2) immediately generates an error sent to the alarm module (9). The interconnect module (2) makes it possible to increase the level of parallelism and the performance of the entire cryptographic system (1). The FIFO-type slave interfaces make it possible to post several read requests to an external memory and to subsequently retrieve the corresponding data without penalty to the internal bandwidth. The width of the data buses of the interconnect module (2) is variable based on the module type. It is generally between 32 bits and 64 bits. Any module can have several master or slave attachments in order to increase the level of parallelism and the performance of the system.

Figure 5:
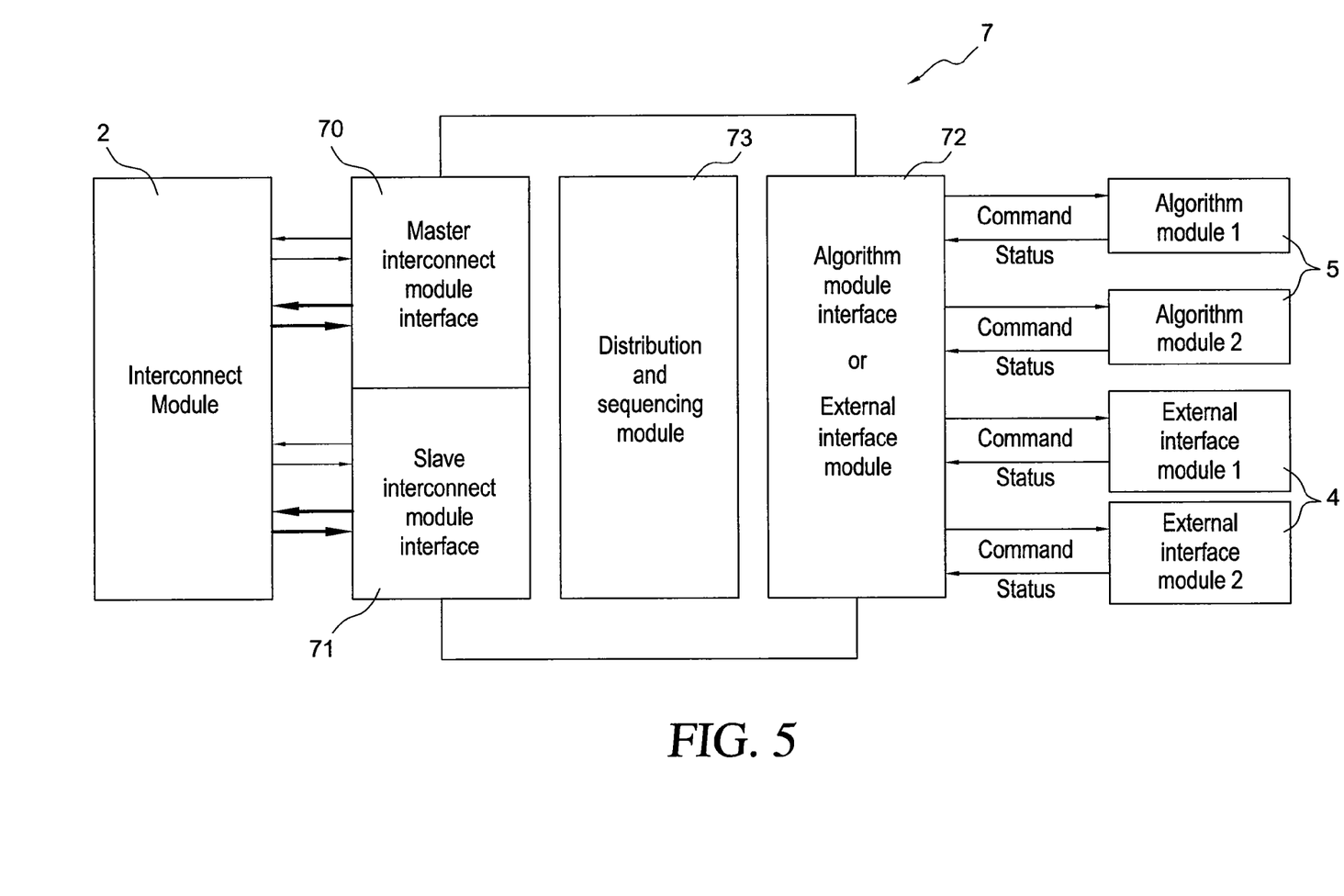
FIG. 5 shows a diagram representing a sequencer module of the cryptographic system according to an embodiment of the present invention.
Figure 6:
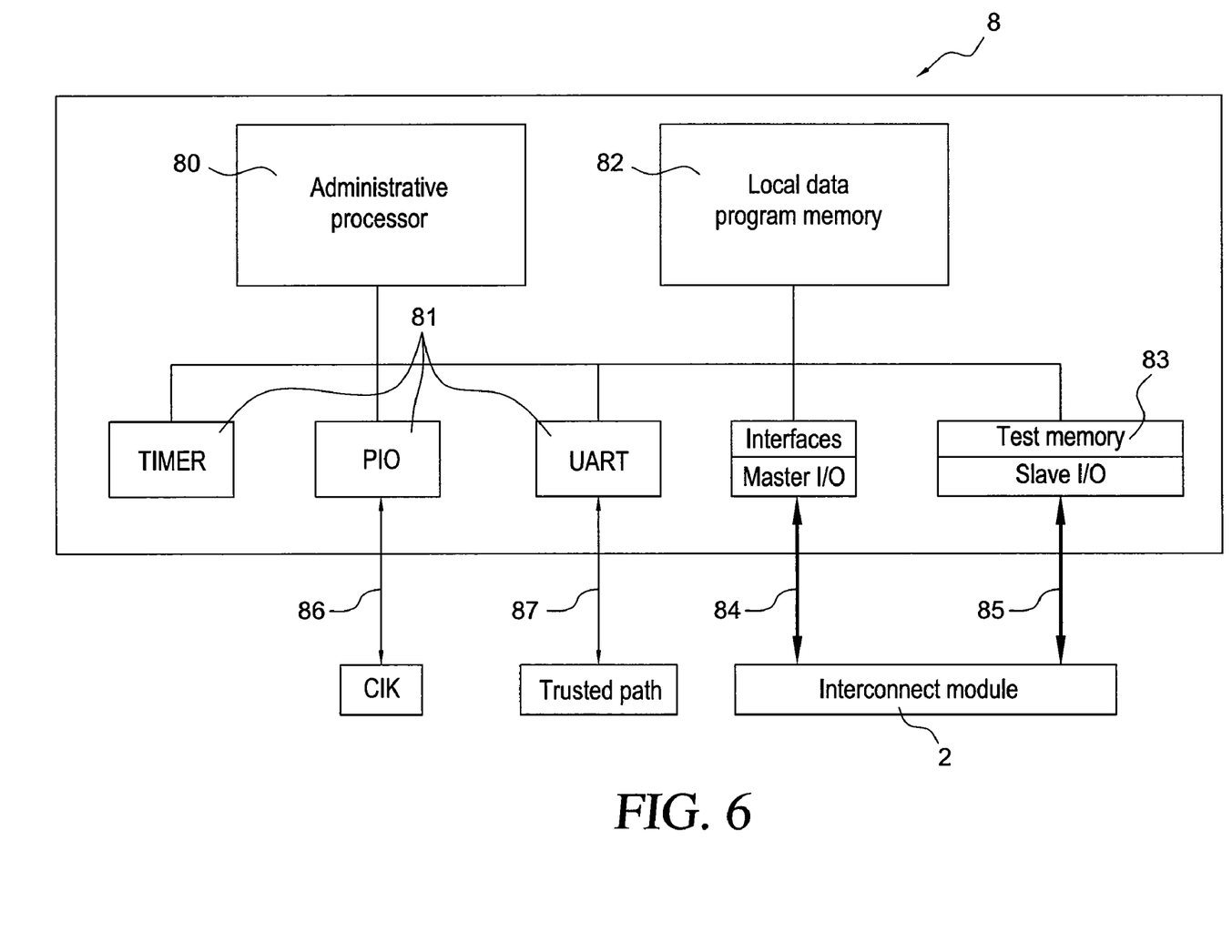
FIG. 6 shows a diagram representing an administration module of the cryptographic system according to an embodiment of the present invention.

FIG. 6 represents a sequencer module (7) implemented in the cryptographic system (1) of the present invention. The sequencer module (7) plays the role of master control unit for the cryptographic part of the system. It is this module that receives the macro commands or the commands coming, respectively, from the protocol module (1) located inside or outside the cryptographic system or from the administration module (8). The sequencer module (7) creates the cryptographic micro commands and distributes them to the algorithm modules (5, 5', 5") and the corresponding external interface modules (4, 4', 4"). The sequencer module (7) allocates and distributes the workload among the various modules. It guarantees the sequencing of the commands and delivers to the protocol module (10) or to the administration module (8) an end-of-command or error status. Referring to FIG. 5, the sequencer module (7) includes three interfaces. A first interface (70) is a 32-bit master interface that is linked to the interconnect module (2). This interface (70) is used to return the end-of-command statuses to the initiating modules such as the protocol module (10) and the administration module (8). A second interface (71) is a 32-bit slave interface linked to the interconnect module (2). This interface (71) is used by the initiating modules to send the sequencer module (7) the macro commands or the test commands to be executed. It is also used to receive the end-of-operation statuses sent by certain modules, for example the external interface module (4). A third interface (72) is linked to the algorithm processing modules (5, 5', 5") and the external interface modules (4, 4', 4"), with direct memory access.

The same algorithm module (5) can be made to multiplex several command queues in order to facilitate the sequencing task of the sequencer module (7) without its being necessary or desirable to increase the number of modules. The control or status signals are, in this case, doubled or tripled in order to accommodate the existence of several queues.

The sequencer module includes a means for distributing the commands (73), which breaks each macro command down into encryption and/or partitioning micro commands and sends the latter to the command memory modules (3) of the cryptographic system (1). Thus, an IPSEC encryption macro-command can be broken down into a certain number of micro commands, such as a direct memory access (DMA) command to be sent to an external interface module (4), a random number generator (RNG) command for an initialization vector, or an encryption command (ENC). The sequencer module (7) includes a means for sequencing commands. This means activates the algorithm modules (5, 5', 5") in the order required for the proper execution of the corresponding macro command. An example of a command sequencing is presented below:

1. START DMA in
    END DMA in
2. START RNG
    END RNG
3. START ENC

The START Command sent by the sequencer module (7) to an algorithm module is activated by the sequencing means upon reception of the end status END from the previous algorithm module (5) or external interface module (4). Each START command increments a specific command counter of the algorithm module (5) or external interface module (4) in question. This counter is decremented by an end-of-command status END coming from the same module. As long as this command counter is not at zero, the module in question remains active. This continuous mode of operation is known and has already been used in the PCA-card microprocessor environment protected by French patent 2,834,361. When the modules executing operations are implemented in the system in inconsistent numbers, for example four encryption modules and only one external interface module, the task of the sequencing means is facilitated by multiplexing several command queues in a single module, in order to manage four independent command queues. Thus the single module, in this case the external interface module (4), acts, where its input/outputs are concerned, like four independent virtual modules.

The sequencer module (7) described therefore makes it possible to meet two requirements. The first requirement is the important implementation of parallelism among the various modules in order to satisfy the performance criterion of the system of the present invention. The second requirement is to offer the protocol processing module a macro command-type interface that can flexibly adapt to various types of protocols while masking the details of the purely cryptographic part.

The protocol module (10) makes it possible to implement a security protocol like the IPSEC protocol presented at the beginning of the description. The protocol module (10) can be located inside or outside the cryptographic system (1). The protocol module (10) comprises one or more processing submodules, such as state machines in the case of a purely hardwired implementation or a processor associated with a program memory in the case of a micro software implementation. This protocol module (10) also includes one or more interface submodules linked to the internal bus of the interconnect module when said module is included in the control unit (6) of the system (1), the mission of the interface submodules being to handle the accesses to the internal and external memories of the cryptographic system (1) as well as the accesses to the sequencer module (7). The level of parallelism that can be expected depends on the number of interface submodules of the protocol module (10). Thus, the protocol module (10) receives data from the external interface modules (4, 4', 4"), performs a syntactic and protocol analysis of it and creates the macro commands to be sent to the sequencer module (7). Each macro command contains the necessary information for the cryptographic part such as the keys to be used, the pointers to the data buffer memories, and the algorithm types. Thus, it does not have to be directly involved in managing the algorithm modules (5, 5', 5"), which are handled by the sequencer module (7).

FIG. 6 shows a diagram representing the administration module (8) included in the control unit of the system of the present invention. This module includes an administrative processor (80) associated with standard peripheral circuits (81) of the UART, TIMERS and PIO types. The program executed by the administrative processor (80) is located in an internal memory (82) of the system. The administration module (8) also includes a test memory (83) that allows the module to perform continuous tests of the algorithms without interfering with the data and key memories. The administration module (8) also includes a master interface (85) and a slave interface (84) linked to the interconnect module (2). The master interface (85) makes it possible to send the sequencer module (7) the test commands to be executed, and to receive abnormal operation statuses from certain modules of the cryptographic system (1). The slave interface (84) makes it possible to receive the end-of-command statuses of the test commands executed by the algorithm modules and sent by the sequencer module (7). There are multiple roles assigned to this module in the system of the present invention. One of these roles consists of initializing the internal key memory at the startup of the system and of reading the encrypted keys in an external memory or through a dedicated external link, then decrypting these keys and storing them in the internal memory. This is the only module of the system authorized to write into the secure internal key memory. Another role of the administration module (8) is to test the operation of the internal modules. These tests are done each time the system is powered up, and also continuously in order to ensure the integrity of the algorithms implemented. The administration module (8) also makes it possible to manage an external interface (86) such as a serial or microcircuit interface, which supports a key injection function and an authentication function. The administration module manages an external link (87) dedicated to the passage of sensitive data. This external link is also called a trusted path. The administration module (8) makes it possible to initialize certain external memories associated with the known protocol processing of the CAMs and SRAMs type. The administration module (8) makes it possible to retrieve the error statuses coming from the algorithm modules (5).

Referring to FIG. 1, it may be seen that the monitoring and alarm module (9) is one of the only modules of the system comprising only one submodule, the heart submodule. This module communicates only with the administration module (8). The role of the monitoring and alarm module is to centralize, via the administration module (8), all of the error signals coming from the other modules and consequently manage the security policy implemented by the system of the present invention. An error signal is activated each time an algorithm module (5) detects an error in the command it will read in memory. An error signal is activated by the secure memory module (3) upon detection of a key transmission error or a virus attack. An error signal is activated by the interconnect module (2) upon detection of an access violation. An error signal is activated by the administration module (8) upon detection of an error in the internal tests. An error signal is activated from the outside by an external component, for example a processor controlling the network interfaces. Added to these error signals are various external security signals, such as an emergency reset signal activated by an emergency stop button-type mechanism and a hardware intrusion detection signal. The monitoring and alarm module (9) generates signals that make it possible to reset the secure memories. These signals are sent to the secure memory modules (3, 3', 3") to order the clearing of the sensitive contents. The monitoring and alarm module (9) also generates signals for inhibiting the sensitive parts of the system, such as the sequencer module (7) and the external interface module (4), in case of the occurrence of a major incident such as an error or an emergency reset, in accordance with the security policy implemented by the system.

The modular architecture of the cryptographic system of the present invention offers a modularity among the cryptographic parts and the protocol parts, the protocol part being able to be located either inside or outside the cryptographic system (1). The architecture of the system of the present invention also offers a modularity of the communication interfaces, supporting various interface standards without any modification of the architecture and without any impact on the cryptographic and protocol parts. The system obtains a high performance level thanks to a substantial parallelism of the algorithm blocks (5, 5', 5"), a multiplicity of memories and a hardwired command sequencing module (7). The system also offers a very high level of security, obtained through the implementation of the various modules: the administrator (8) and monitoring and alarm (9) modules, the interconnect module (2) and the memory modules (3, 3', 3"). The administration module (8) is responsible for the reliability of the various algorithm modules (5, 5', 5") and the key management. The monitoring and alarm module (9) is responsible for handling the various cases of errors and for activating essential security functions such as the re-initialization of the key memories and the inhibiting of the input/outputs. The interconnect module (2) is capable of handling secure exchanges between blocks with access rights to the memories, and the partitioning of the paths. The secure memory module contains the keys, with integrity checking and an emergency erase function.

It should be clear to those well versed in the art that the present invention allows for embodiments in many other specific forms without going beyond the field of application of the invention as claimed. Consequently, the present embodiments should be considered illustrative, but can be modified within the range defined by the scope of the attached claims, and the invention should not be limited to the details given above.

What is claimed is:

1. A cryptographic system with a modular architecture, comprising:
   memory modules for storing information concerning authentication keys, data and commands, including a secure memory module for storing the authentication keys with integrity checking and an emergency erase function;
   algorithm modules for performing cryptographic functions of the cryptographic system by executing the commands stored in at least one memory module;
   external interface modules for generating a link between the cryptographic system and external devices, through a standard or proprietary input/output bus;
   a control unit for supervision of algorithm modules and the management of the authentication keys; and
   a central interconnect module for handling secure exchanges between the modules, and for interconnecting the algorithm modules, the memory modules, the external interface modules, and the control unit;
   wherein the control unit is further configured to test the operation of the modules in the system.

2. A cryptographic system with a modular architecture according to claim 1, the control unit comprising:
   a sequencer module to perform functions for distributing and sequencing commands by storing said commands in at least one memory module, triggering the execution of the algorithm modules and the external interface modules via a command block, and receiving a status word indicating the end of execution of said algorithm modules and external interface modules;
   an administration module for monitoring the modules in the system, for sending test commands to the sequencer module, and for receiving a status word indicating that a fault has occurred in the cryptographic system; and
   a monitoring and alarm module linked to the administration module, to handle abnormal operations originating from other modules of the cryptographic system and to activate security functions.

3. A cryptographic system with a modular architecture according to claim 2, further comprising a protocol module to implement a security protocol by sending cryptographic macro commands to the sequencer module, the protocol module being linked to the central interconnect module or to at least one external interface module, and it may or may not be integrated into the cryptographic system.

4. A cryptographic system with a modular architecture according to claim 3, further including main master modules, main slave modules, and main master-slave modules, wherein the main master modules include the protocol module, the administration module, the algorithm modules and first external interface modules, the main slave modules include the memory modules, and the main master-slave modules include the sequencer module and second external interface modules.

5. A cryptographic system with a modular architecture according to claim 2, wherein each algorithm module includes a submodule that executes commands for encryption or decryption or authentication code generation or authentication code verification, and an input/output submodule comprising at least a first interface, a second interface and a third interface, the first interface being linked to an internal bus of the central interconnect module for the transmission of data, keys and commands coming from the memory modules, the second interface being linked via direct memory access to the sequencer module to receive a signal for triggering the execution of a cryptographic command and to send a status word indicating the end of execution of the cryptographic command, the third interface being linked to the administration module to send a status word indicating that an abnormal operation has occurred during the execution of a cryptographic command.

6. A cryptographic system with a modular architecture according to claim 5, wherein the input/output submodule includes an address register, a FIFO memory for sending data, a FIFO memory for receiving data, and a means for managing several command queues in memory, allowing a finer control of parallelism in the execution of the algorithm modules having different transmission speeds.

7. A cryptographic system with a modular architecture according to claim 1, the cryptographic system including at least the following memory modules:
an unencrypted data memory module containing data prior to encryption,
an encrypted data memory module containing data after encryption,
an encryption command memory module containing commands corresponding to the algorithm modules for encryption and authentication code generation,
a decryption command memory module containing commands corresponding to the algorithm modules for decryption and authentication code verification, and
a secure key memory module containing the keys used by the algorithm modules for encryption and authentication code generation.

8. A cryptographic system with a modular architecture according to claim 1, wherein each memory module includes a submodule for storing information and an input/output submodule connected to an internal bus of the central interconnect module by a slave-type interface that allows simple or packet reading and writing in the memory module.

9. A cryptographic system with a modular architecture according to claim 8, wherein the input/output submodule of the memory module has a single-port interface.

10. A cryptographic system with a modular architecture according to claim 8, wherein the input/output submodule of the memory module has a dual port interface allowing two attachments to an internal bus of the central interconnect module, a first attachment for the transmission of unencrypted data and a second attachment for the transmission of encrypted data.

11. A cryptographic system with a modular architecture according to claim 2, wherein the secure memory module includes an input/output submodule comprising two logical blocks:
a first integrity checking block that checks, with each access to the memory, an integrity value associated with a key, and in case of an integrity error, sends the monitoring and alarm module a status word pinpointing the error; and
a second reset block that performs a complete erasure of the memory module by rewriting all addresses by means of a counter, the erasure being ordered by the monitoring and alarm module upon reception of a status word indicating an integrity error.

12. A cryptographic system with a modular architecture according to claim 11, wherein an external interface module comprises a submodule that implements an exchange protocol, and an input/output submodule that operates either in master mode, in slave mode, or in master-slave mode, in accordance with a mode of an exchange protocol, and allows the cryptographic system to adapt to security protocol.

13. A cryptographic system with a modular architecture according to claim 3, wherein the sequencer module comprises:
a command distribution means to break down into micro commands cryptographic macro commands coming from the protocol module, each of the micro commands comprising a simple cryptographic algorithm, and to post the micro commands in a memory module for commands to be sent to other modules;
a first master-type interface linked to the central interconnect module for sending an end-of-execution status word to the protocol module or the administration module;
a second slave-type interface linked to the central interconnect module for receiving macro commands sent by the protocol module or test commands sent by the administration module, and for receiving status words indicating the end of execution of commands sent by the algorithm modules and the external interface modules;
a third interface in direct memory access mode, linked to the algorithm modules and to the external interface modules, for triggering the execution of said modules by sending them a command block; and
a means for sequencing the commands to activate the algorithm modules and the external interface modules in a defined order.

14. A cryptographic system with a modular architecture according to claim 2, wherein the administration module includes an administrative processor, peripheral circuits, an internal memory including a program executed by the administrative processor, a test memory to execute test commands on the algorithm modules or the external interface module, a master interface linked to the central interconnect module to send test commands to the sequencer module and to receive status words indicating faulty modules, a slave interface to receive status words sent by the sequencer module to indicate the end of a test command executed by an algorithm module or an external interface module, and an external link for the passage of sensitive data coming from devices outside the cryptographic system.

15. A cryptographic system with a modular architecture according to claim 2, wherein the administration module initializes the secure key memory module of the cryptographic system at startup of said cryptographic system, reads encrypted keys in a memory of an external device or through a dedicated external link, then decrypts said encrypted keys and writes them into the secure key memory module of the cryptographic system.

16. A cryptographic system with a modular architecture according to claim 1, wherein the central interconnect module includes data and address multiplexers that allow the modules of the cryptographic system to access other modules of the system, arbitration submodules that prevent simultaneous access conflicts between modules, and security mechanisms that guarantee access rights between modules, wherein accesses to the central interconnect module occur concurrently for all of the modules of the cryptographic system.

17. A cryptographic system with a modular architecture according to claim 2, wherein the central interconnect module guarantees read access by the algorithm modules for encryption and authentication code generation to the secure key memory module, by verifying a check word representing the use of each key, and when an error is detected, the central interconnect module sends an error word to the monitoring and alarm module.

18. A cryptographic system with a modular architecture according to claim 2, wherein a command block sent by the sequencer module to an algorithm module comprises:
- a first macro command field including at least two pieces of information, the first piece of information indicating a use of a key and a length of the key, and a second piece of information indicating the management of an optional context,
- a second field indicating a number representing the macro command processed,
- a third field indicating a length of the data located in a buffer memory to be encrypted,
- a fourth field indicating a second address pointing to a buffer memory area for including a result of an execution of the macro command,
- a fifth field indicating a first address pointing to a buffer memory area including the data required to execute the macro command,
- a sixth field including an address of the key required to process the macro command.

19. A cryptographic system with a modular architecture according to claim 2, wherein a command block sent by the sequencer module to an external interface module comprises:
- a first command field including a number of an associated macro command,
- a second field indicating a length of the data to be transferred to or from the outside,
- a third field indicating a first address pointing to a buffer memory area containing the data to be transferred,
- a fourth field indicating a second address pointing to a buffer memory area for receiving data coming from devices outside the cryptographic system.

20. A cryptographic system with a modular architecture according to claim 2, wherein the status word includes at least a first field and a second field, the first field indicating a number of an executed or faulty macro command, and the second field indicating an error code representing a type of fault occurring during the execution of the macro command.

* * * * *